(12) United States Patent
Hsu

(10) Patent No.: US 7,128,589 B1
(45) Date of Patent: Oct. 31, 2006

(54) ELECTRICAL CARD CONNECTOR

(75) Inventor: Chang-Shin Hsu, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/322,415

(22) Filed: Dec. 30, 2005

(30) Foreign Application Priority Data

Aug. 22, 2005 (TW) .................................. 94128538

(51) Int. Cl.
*H01R 13/62* (2006.01)
(52) U.S. Cl. ..................................... 439/159
(58) Field of Classification Search ................ 439/159, 439/160, 152, 155, 157
See application file for complete search history.

(56) References Cited

U.S. PATENT DOCUMENTS 6,802,726 B1 * 10/2004 Chang ....................... 439/159

* cited by examiner

*Primary Examiner*—Javaid H. Nasri
(74) *Attorney, Agent, or Firm*—Wei Te Chung

(57) ABSTRACT

An electrical card connector (100) for receiving and ejecting an electrical card (6), includes a housing (1) holding a number of terminals (2), and having a rear base (11) and two opposite side portions (12, 13) extending forwards from the rear base; an ejector (4) mounted on one of the side portions of the housing and comprising a slider (41) and an elastic member (42) for urging the slider to slide in response to insertion and ejection of the electrical card; and a shielding member (5) covering on the housing and defining a receiving cavity together with the housing for receiving the electrical card, the shielding member formed with a supporting member (511) disposed adjacent to the rear base of the housing. The elastic member has one end fixed at the slider and the other end abutting on the supporting member.

10 Claims, 7 Drawing Sheets

ELECTRICAL CARD CONNECTOR

BACKGROUND OF THE INVENTION

1. Field of the Invention

The present invention relates to an electrical card connector provided for electrically connecting a card to a circuit board, specifically to a card connector having an ejection mechanism.

2. Description of Related Art

In electronic appliances, such as portable telephones, PDA, cameras and the like, various expandable functions are achieved by installing IC cards, such as SIM (subscriber identify module) card, MMC (multimedia card), SD (secure digital) card, MS (memory stick) card and the like therein. Such an IC card is usually connected to the circuit board via a card connector.

U.S. Pat. No. 6,802,726 shows a conventional card connector including a housing comprising a rear wall and a pair of opposing side walls extending forwards from the rear wall, a plurality of terminals retained in the rear wall of the housing, a shielding member covering on top of the housing so as to define a receiving cavity together with the housing for receiving an electrical card, and an ejector positioned on one of the side walls of the housing for realizing ejection of the card. The ejector comprises a slider and a spring connecting the slider to the housing and making the slider slidable relative to the housing in response to insertion of ejection of the card. The spring has one end fixed in a hole defined in the slider, the other end fixed on and abutting against the rear wall of the housing. While the electrical terminals being soldered to a circuit board, the whole connector is at a relatively high temperature. Especially for the rear wall of the housing, as a lot of heat will conveyed from the electrical terminals to the rear wall of the housing on which the electrical terminals are mounted during soldering of the electrical terminals, the rear wall will be intenerated by those heat. Once the rear wall is intenerated, the spring directly abutting against and giving a pressure on the rear wall will cause a deformation of the rear wall. In reverse, the deformation of the rear wall will affect soldering effect of the electrical terminals fixed therein.

Therefore, an improved card connector is desired to overcome the disadvantages of the prior arts.

SUMMARY OF THE INVENTION

An object of the present invention is to provide a card connector in which electrical terminals can be reliably soldered to a circuit board.

In order to achieve above-mentioned object, an electrical card connector for receiving and ejecting an electrical card, in accordance with a preferred embodiment of the present invention, includes a housing holding a number of terminals, and having a rear base and two opposite side portions extending forwards form the rear base; an ejector mounted on one of the side portions of the housing and comprising a slider and an elastic member for urging the slider to slide in response to insertion and ejection of the electrical card; and a shielding member covering on the housing and defining a receiving cavity together with the housing for receiving the electrical card, the shielding member formed with a supporting member disposed adjacent to the rear base of the housing. The elastic member has one end fixed at the slider and the other end abutting on the supporting member.

Other objects, advantages and novel features of the present invention will become more apparent from the following detailed description of the present embodiment when taken in conjunction with the accompanying drawings.

DETAILED DESCRIPTION OF THE INVENTION

Figure 1:
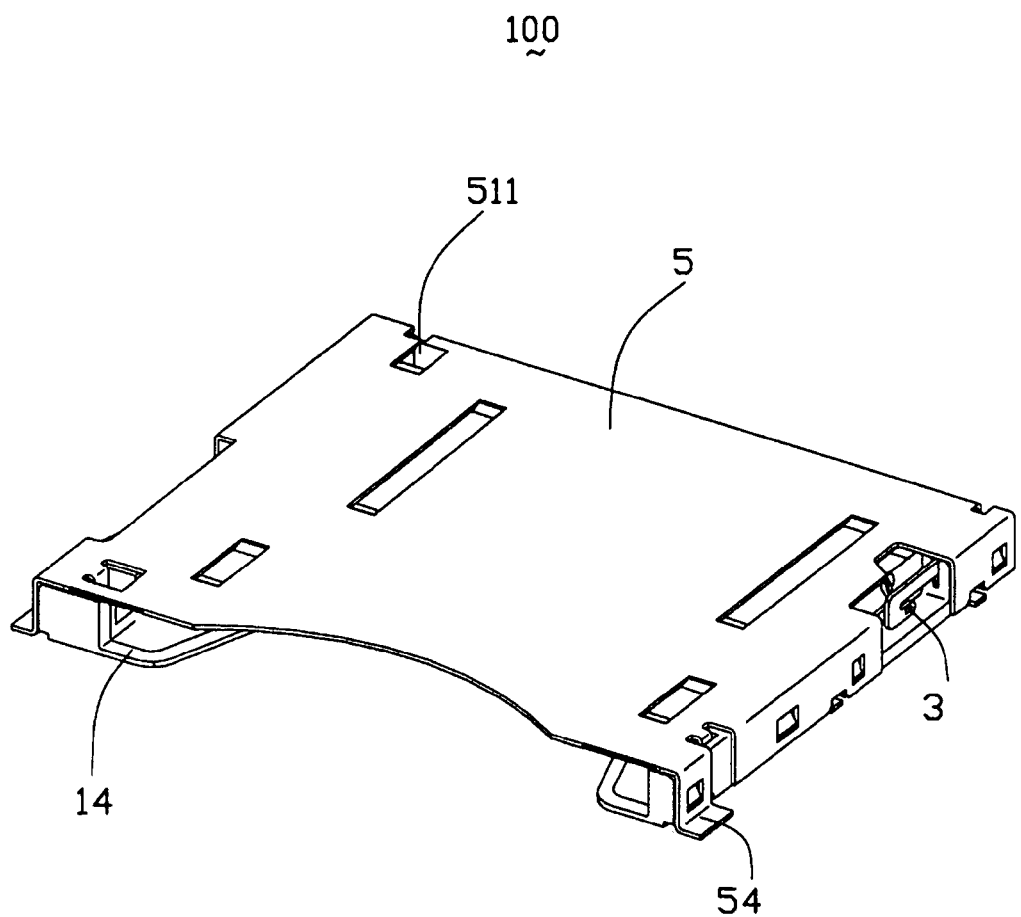
FIG. 1 is an assembled perspective view of a card connector in accordance with the preferred embodiment of the present invention.
Figure 2:
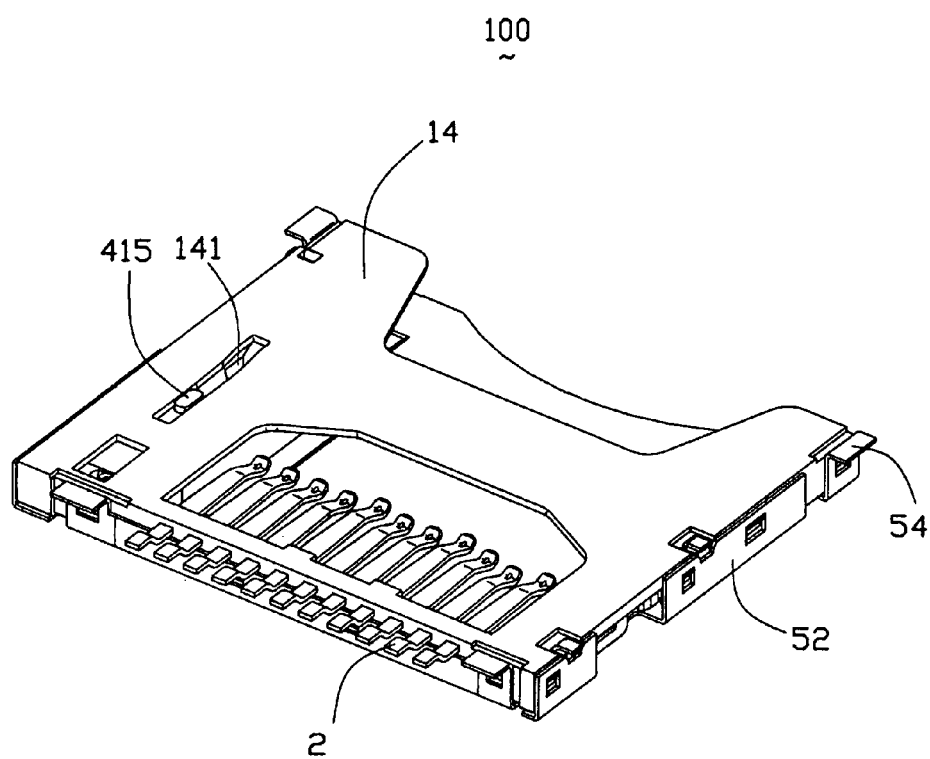
FIG. 2 is another assembled perspective view of the card connector of FIG. 1 taken from an aspect different from that of FIG. 1.
Figure 3:
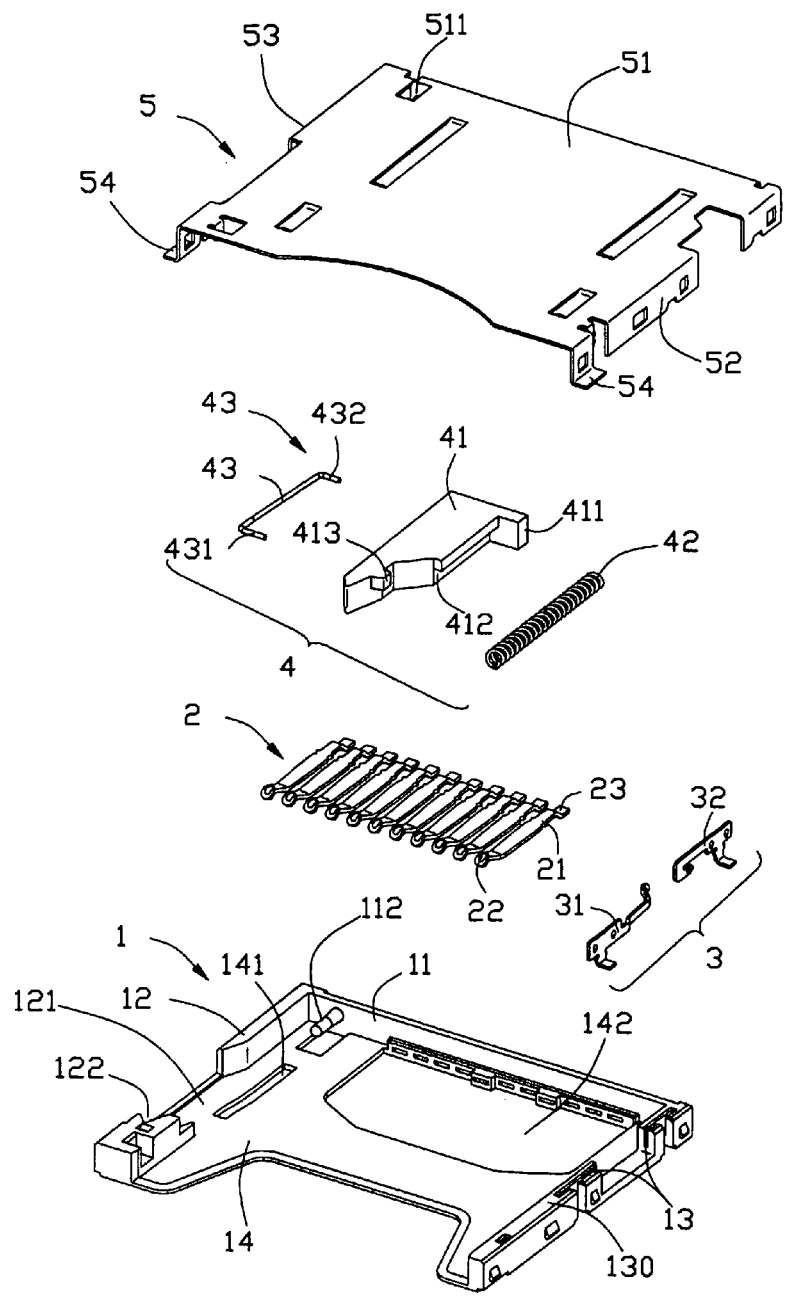
FIG. 3 is an exploded, perspective view of the card connector of FIG. 1.

Reference will now be made to the drawing figures to describe the preferred embodiment of the present invention in detail.

Referring to FIGS. 1–4, a card connector 100 for connecting a card 6 (shown in FIG. 6) to a circuit board (not shown) in accordance with the preferred embodiment of the present invention comprises an insulative housing 1, a plurality of contact terminals 2 received in a rear portion of the housing 1, a switch terminal assembly 3 received in one side of the housing 1, an ejector 4 received in the other side of the housing 1, a shielding member 5 covering on top of the housing 1.

The housing 1 has a rear wall 11, a first side wall 12, a second side wall 13 and a bottom wall 14, all of which define an upward opening 10 together. The rear wall 11 has a plurality of contact terminal receiving slots 111 for receiving the plurality of contact terminals 2. A post 112 is formed on the rear wall 11 adjacent to the first side wall 12 and extends forwardly into the opening 10. The first side wall 12 defines a recess 121 having an acuminate portion 122. The second side wall 13 defines a switch terminal receiving recess 131 for receiving the switch terminal 3. The bottom wall 14 defines a through slot 141 adjacent to the recess 121 for engaging with the ejector 4 and a through area 142 adjacent to the contact terminal receiving slots 111 for providing a space for the contact terminals 2 to perform elastic deflection while the card 6 being inserted in the opening 10.

Each of the contact terminal 2 comprises a retaining portion 21, a contact portion 22 extending forwards from the retaining portion 21 and a solder portion 23 extending rearwards from the retaining portion 21. The switch terminal assembly 3 is used for detecting whether the card 6 is completely assembled, and includes a first terminal 31 and a second terminal 32 which can be either connected together or separate from each other. As the switch terminal assembly is a well-known technique used in card connectors, uncecessary details about it will not be given here.

The ejector 4 comprises a slider 41, a spring 42, and a slider rod 43. The slider 41 has an L-shaped main body and defines a pushing block 411 for pushing and ejecting the card 6 and a guide passage 412 for guiding slide movement of the card 6 during insertion of the card 6. The front end of the slider 41 is formed into an acuminate tip shape for fitly engaging with the acuminate portion 122 of the recess 121 of the housing 1. There are a lock protuberance 413 formed at a front section of the main body for locking the card 6, a groove 414 (shown in FIG. 6) formed in an exterior side surface of the main body for receiving a first end 431 of the slider rod 43 which is slidable therein, a rib 415 (shown in FIG. 2) formed on a bottom surface of the main body for moving within the through slot 141 of the housing 1, and a spring fixing hole (not labeled) defined in a rear surface of the main body for receiving and fixing one end of the spring 42, the other end of which is fixed on the post 112. The spring 42 enables the slider 41 to move in a sliding direction in response to insertion of the card 6 and slides between a forward position whereat the card 6 is not inserted and a back position whereat the card 6 is inserted.

Figure 4:
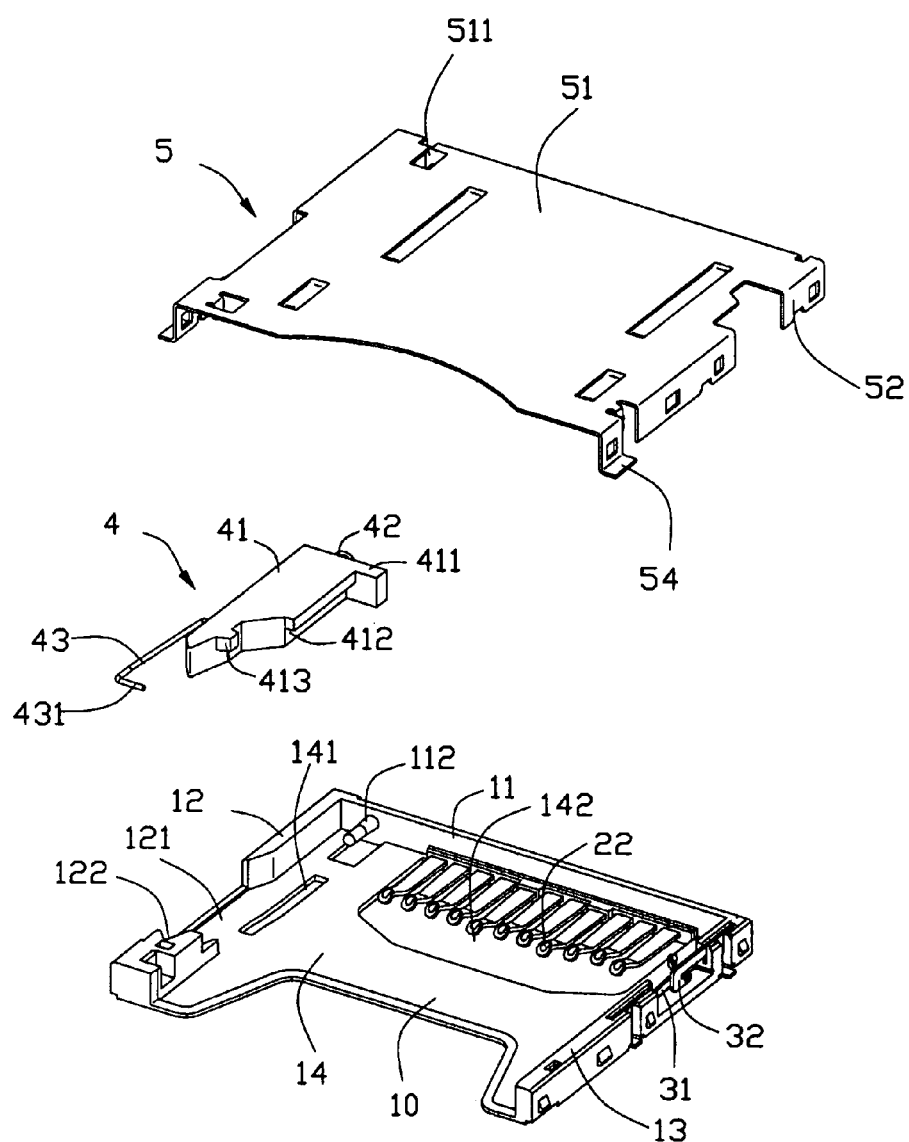
FIG. 4 is a partly assembled view of the card connector of FIG. 3, wherein the terminals are assembled in the housing, and the spring slider rod are assembled in the slider.
Figure 5:
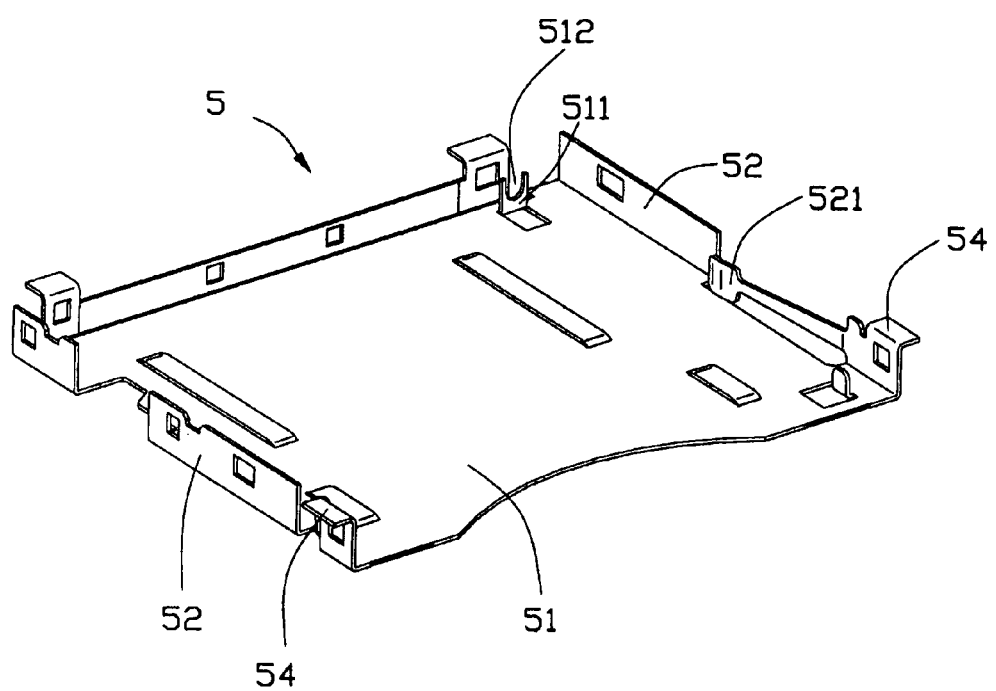
FIG. 5 is a view showing the shielding member of the card connector of FIG. 1 singly.
Figure 6:
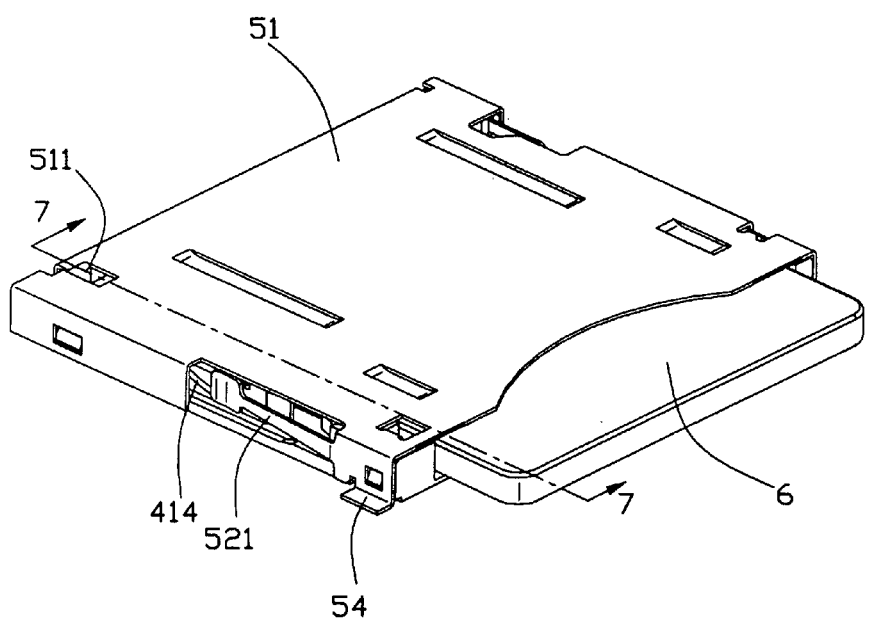
FIG. 6 is a view illustrating the card connector of FIG. 1 inserted with a card.

Referring FIGS. 4–6, the shielding member 5 has a top wall 51, a first side edge 52 and a second side edge 53 respectively attached to the first side wall 12 and the second side wall 13 of the housing 1, wherein the first side edge 52 is provided with a deflectable latch 521 adapted for abutting against the slider rod 43 to preventing it from being detached from the slider 41. Both the first and second side edges 52, 53 define a plurality of retaining slots (not labeled) for engaging with protrusions formed on periphery surfaces of the side wall 12, 13, so as to retain the shielding member 5 to the housing 1. The shielding member 5 further has a pair of solder plates 54 respectively bent from the side edge 52 and 53 adjacent to the front side thereof, and adapted to be solder to the circuit board the card connector 100 is mounted on. Additionally, the shielding member is provided with a spring supporting member, a plate 511 integrally torn and bent from the top wall 51 in this preferred embodiment, for supporting the spring 42 and receiving the pressure from the spring 42. The plate 511 defines a cutout 512 corresponding to the post 112.

Mainly referring to FIGS. 4–6, in assembly, the contact terminals 2 is firstly assembled into the contact terminal receiving slots 111 at the rear wall 11. Then the switch terminal 3 is fixed into the switch terminal receiving recess 131 at the second side wall 13. Then the ejector 4 is mounted to the housing 1 with the acuminate tip of the slider 41 received in the acuminate portion 122 of the recess 121, the spring 42 having the free end haven't been fixed on the slider 41 hold on the post 112, the slider rod 43 having a second end 432 thereof fixed into a corresponding hole (not labeled) defined in the first side wall 12. Lastly, the shielding member 5 is disposed on top of the housing 1 so as to covering the opening 10 to form a forwards opened card receiving cavity for fitly receiving the card 6.

Figure 7:
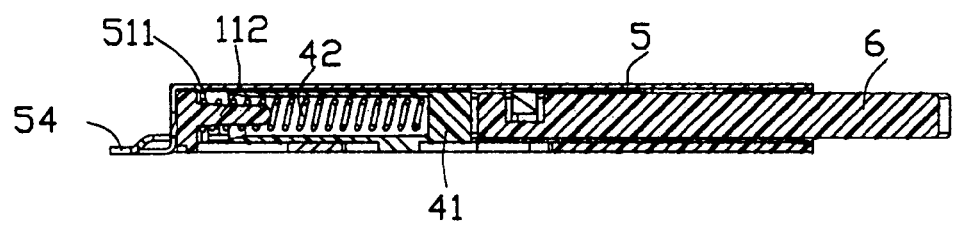
FIG. 7 is a cross-sectional view of FIG. 7 along 7—7.

In conjunction with FIG. 7, in assembly, the spring supporting plate 511 of the shielding member 5 is locked onto the rear portion of the post 112 adjacent to the rear wall 11 with the post 112 fitly locked in the cutout 512 thereof. In this way, while the card 6 is inserted into the card connector 100, the spring 42 is urged to abut on the plate 511 of the shielding member 5 rather than directly abut on the rear wall 11 of the housing 1, so that the pressure from the spring 42 is given to the shielding member 5 rather than the rear wall 11 of the housing 1. Therefore deformation may occur on the rear wall 11 due to the pressure from the spring 42 during soldering of the terminals 2 can be avoided. Otherwise, such a design providing the spring supporting plate 511 on the shielding member 5 as illustrated in this preferred embodiment needs no additional mechanism.

However, the disclosure is illustrative only, changes may be made in detail, especially in matter of shape, size, and arrangement of parts within the principles of the invention. For example, the spring supporting plate 511 could be bent from the side edge 52 while a through hole is provided in the side wall 12 of the housing 1 for it to extend through, or could be an isolated member assembled to the shielding member 5.

What is claimed is:

1. An electrical card connector for receiving and ejecting an electrical card, comprising:
   a housing holding a plurality of terminals, the housing having a rear base and two opposite side portions extending forwards from the rear base;
   an ejector mounted on one of the side portions of the housing and comprising a slider and an elastic member for urging the slider to slide in response to insertion and ejection of the electrical card; and
   a shielding member covering on the housing and defining a receiving cavity together with the housing for receiving the electrical card, said shielding member formed with a supporting member disposed adjacent to the rear base of the housing;
   wherein the elastic member has one end fixed at the slider and the other end abutting on the supporting member.

2. The electrical card connector as described in claim 1, wherein the shielding member has a top wall and the supporting member is bent into the receiving cavity from said top wall.

3. The electrical card connector as described in claim 1, further comprising a switch terminal assembly mounted on the other side portion of the housing.

4. The electrical card connector as described in claim 1, wherein the shielding member has a pair of solder plates adapted to be soldered to a circuit board.

5. The electrical card connector as described in claim 1, wherein the housing has a bottom wall defining a slot, and the slider has a rib movably received in the slot.

6. The electrical card connector as described in claim 1, wherein the housing has a post formed on the rear base thereof for holding the elastic member.

7. The electrical card connector as described in claim 6, wherein the supporting member defines a cutout for engaging with the post.

8. The electrical card connector as described in claim 1, wherein the ejector comprises a slider rod having one end fixed in the housing and the other end slidably mounted on the slider.

9. The electrical card connector as described in claim 8, wherein the shielding member provides a deflectable latch abutting against the slider rod.

10. An electrical card connector for receiving and ejecting an electrical card, comprising:
    an insulative housing holding a plurality of terminals and having at least one side portion;
    an ejector mounted on the side portion of the housing and comprising a slider and an elastic member for urging the slider to slide in response to insertion and ejection of the electrical card; and
    a shielding member covering on the housing and defining a receiving cavity together with the housing for receiving the electrical card, said shielding member formed with a supporting member disposed adjacent to a rear portion of the housing;
    wherein the elastic member has one end abutting against the slider and the other end abutting on the supporting member.

* * * * *